(12) United States Patent
Mao

(10) Patent No.: US 6,466,419 B1
(45) Date of Patent: Oct. 15, 2002

(54) CURRENT PERPENDICULAR TO PLANE SPIN VALVE HEAD

(75) Inventor: Sining Mao, Savage, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 9 days.

(21) Appl. No.: 09/689,970

(22) Filed: Oct. 12, 2000

Related U.S. Application Data

(60) Provisional application No. 60/193,560, filed on Mar. 31, 2000.

(51) Int. Cl.[7] ................................................ G11B 5/39
(52) U.S. Cl. .................................. 360/324.12; 360/319
(58) Field of Search ............................ 360/319, 324.1, 360/324.11, 324.12, 324.2

(56) References Cited

U.S. PATENT DOCUMENTS

| | | |
|---|---|---|
| 4,103,315 A | 7/1978 | Hempstead et al. |
| 4,436,593 A | 3/1984 | Osborne et al. |
| 4,663,685 A | 5/1987 | Tsang |
| 4,713,708 A | 12/1987 | Krounbi et al. |
| 4,785,366 A | 11/1988 | Krounbi et al. |
| 4,935,832 A * | 6/1990 | Das et al. .................... 360/112 |
| 5,206,590 A | 4/1993 | Dieny et al. |
| 5,251,170 A | 10/1993 | Daughton et al. |
| 5,390,061 A | 2/1995 | Nakatami et al. |
| 5,420,819 A | 5/1995 | Pohm |
| 5,446,613 A | 8/1995 | Rottmayer |
| 5,496,759 A | 3/1996 | Yue et al. |
| 5,578,342 A | 11/1996 | Tran et al. |
| 5,583,725 A | 12/1996 | Coffey et al. |
| 5,668,688 A | 9/1997 | Dykes et al. |
| 5,729,410 A | 3/1998 | Fontana, Jr. et al. |
| 5,753,131 A | 5/1998 | Choukh et al. |

(List continued on next page.)

FOREIGN PATENT DOCUMENTS

| | | | |
|---|---|---|---|
| JP | 11-25431 | * | 1/1999 |

OTHER PUBLICATIONS

U.S. patent application Ser. No. 09/442,798, Mack et al., filed Nov. 18, 1999.

W.F. Engelhoff, Jr., et al., "Specular Electron Scattering in Giant Magnetoresistance Spin Valves", IEEE Transactions on Magnetics, vol, 33, No. 5, Sep. 1997, 3 pages.

J.C.S. Kools et al., "Process monitoring of spin–valve GMR deposition", IEEE Transactions on Magnetics, vol. 34, No. 4, Jul. 1999, 3 pages.

H.J.M. Swagten et al., "Specular Reflection in Spin Valves Bounded by NiO layers", IEEE Transactions on Magnetics, vol. 34, No. 4, Jul. 1999, 6 pages.

C. Tsang, "Unshielded MR elements with patterned exchange–biasing", IEEE Transaction on Magnetics, vol. 25 (5), pp. 3692–3694 (1989).

(List continued on next page.)

Primary Examiner—David L. Ometz
(74) Attorney, Agent, or Firm—Kinney & Lange, P.A.

(57) ABSTRACT

A spin valve head according to the present invention includes a spin valve stack having a free layer, a first spacer layer, a pinned layer and a pinning layer. The spin valve stack is configured to operate in a current perpendicular to plane (CPP) mode, wherein a sense current flows substantially perpendicular to a longitudinal plane of the first spacer layer. The spin valve head includes a first shield and a second shield coupled to opposing sides of the spin valve stack. The first and the second shields act as electrodes to couple the sense current to the spin valve stack. The first shield has a concave shape and substantially surrounds the free layer. The spin valve head also includes a second spacer layer and a layer of antiferromagnetic material. The second spacer layer is formed on the free layer. The layer of antiferromagnetic material is formed on the second spacer layer.

18 Claims, 11 Drawing Sheets

U.S. PATENT DOCUMENTS

| | | | |
|---|---|---|---|
| 5,756,366 A | | 5/1998 | Berg et al. |
| 5,804,085 A | | 9/1998 | Wu et al. |
| 5,828,530 A | * | 10/1998 | Gill et al. .................... 360/319 |
| 5,863,448 A | | 1/1999 | Otani et al. |
| 5,867,889 A | | 2/1999 | Dovek et al. |
| 5,880,910 A | | 3/1999 | Shouji et al. |
| 5,898,548 A | * | 4/1999 | Dill et al. .................... 360/319 |
| 5,901,432 A | | 5/1999 | Armstrong et al. ...... 29/603.14 |
| 5,949,623 A | | 9/1999 | Lin |
| 6,023,395 A | * | 2/2000 | Dill et al. ................. 360/324.2 |

OTHER PUBLICATIONS

Juan J. Fernandez–de–Castro, et al., "Permanent Magnet Stabilization of an Overlaid MR Head", IEEE Transactions on Magnetics, Intermag '96.

Magnetoresistive heads by John Mallinson, Academic Press, London (1996).

Sining Mao, et al., "NiMn–pinned spin valves with high pinning field made by ion beam sputtering", Appl. Phys. Lett. 69, 2593 (1996).

Intermag '96, IEEE Transactions on Magnetics.

Taras Pokhl, Sining Mao, and Anthony Mack, "Study of exchange anisotrophy in NiFe/NiMn and NiFe/IrMn exchange coupled films", J. Appl. Phys. 85, 4916 (1999).

A. Pohm, et al., "Narrow, End–on, GMR Read–Head Sensors", Digest of the International Conference on Magnetics (INTERMAG), AA–06, Apr. 1996.

J. M. Daughton, "Weakly Coupled GMR Sandwiches", IEEE Trans. Magn. 30, 364 (1994).

R. Rottmayer, et al., "A New Design For An Ultra–High Density Magnetic Recording Head Using A GMR Sensor In The CPP Mode", IEEE Tran. Magn. 31, 2597 (1995).

T. Lin et al., "Exchange–Coupled Ni–Fe/Fe–Mn, Ni–Fe/Ni–Mn and NiO/Ni–Fe Films for Stabilization of Magnetoresistive Sensors", IEEE Tran. Magn. 31, 2585 (1995).

S. Lee et al., "Current–perpendicular and current–parallel giant magnetoresistances in Co/Ag multilayers", Phys. Rev. 52, 426 (1995).

J. Gu et al., "Enhancing current–perpendicular magnetoresistance in Permalloy–based exchange–biased spin valves by increasing spin–memory loss", J. Appl. Phys. 87, 4831 (2000).

"Magnetic Recording Technology", McGraw–Hill, 1990, Ed. C. D. Mee et al., p. 2.13.

Z. Qian et al., "Magnetic behavior of NiFe/NiO bilayers", J. Appl. Phys. 83, 6825 (1998).

Y. Huai, MMM 99, "IrMn based spin–filter spin–valves", J. Appl. Phys. 87, 5741 (2000).

M. Gijs et al., "Temperature dependence of the spin–dependent scattering in Co/Cu multilayers determined from perpendicular–giant–magnetoresistance experiments", Phys. Rev. 50, 733 (1994).

* cited by examiner

CURRENT PERPENDICULAR TO PLANE SPIN VALVE HEAD

CROSS-REFERENCE TO RELATED APPLICATION(S)

This application claims the benefit of the filing date of U.S. Provisional Application Serial No. 60/193,560 entitled "CPP SPIN VALVE HEAD TO REDUCE THE SIDE READING AND IMPROVE MAGNETIC STABILITY", which was filed Mar. 31, 2000.

BACKGROUND OF THE INVENTION

The present invention relates generally to magnetoresistive read sensors for use in magnetic read heads. In particular, the present invention relates to a current perpendicular to plane (CPP) spin valve head with reduced side reading and improved magnetic stability.

A magnetic read head retrieves magnetically-encoded information that is stored on a magnetic medium or disc. The magnetic read head is typically formed of several layers that include a top shield, a bottom shield, and a read sensor positioned between the top and bottom shields. The read sensor is generally a type of magnetoresistive sensor, such as a giant magnetoresistive (GMR) read sensor. The resistance of a GMR read sensor fluctuates in response to a magnetic field emanating from a magnetic medium when the GMR read sensor is used in a magnetic read head and positioned near the magnetic medium. By providing a sense current through the GMR read sensor, the resistance of the GMR read sensor can be measured and used by external circuitry to decipher the information stored on the magnetic medium.

A common GMR read sensor configuration is the GMR spin valve configuration in which the GMR read sensor is a multi-layered structure formed of a ferromagnetic free layer, a ferromagnetic pinned layer and a nonmagnetic spacer layer positioned between the free layer and the pinned layer. The magnetization direction of the pinned layer is fixed in a predetermined direction, generally normal to an air bearing surface of the GMR spin valve, while a magnetization direction of the free layer rotates freely in response to an external magnetic field. An easy axis of the free layer is generally set normal to the magnetization direction of the pinned layer. The resistance of the GMR read sensor varies as a function of an angle formed between the magnetization direction of the free layer and the magnetization direction of the pinned layer. This multi-layered spin valve configuration allows for a more pronounced magnetoresistive effect than is possible with anisotropic magnetoresistive (AMR) read sensors, which generally consist of a single ferromagnetic layer.

Typically, the magnetization of the pinned layer is fixed in the predetermined direction by exchange coupling an antiferromagnetic layer to the pinned layer. The antiferromagnetic layer is positioned upon the pinned layer such that the antiferromagnetic layer and the free layer form distal edges of the GMR spin valve. The spin valve is then heated to a temperature greater than a Néel temperature of the antiferromagnetic layer. Next, a magnetic field oriented in the predetermined direction is applied to the spin valve, thereby causing the magnetization direction of the pinned layer to orient in the direction of the applied magnetic field. The magnetic field may be applied to the spin valve before the spin valve is heated to the temperature greater than the Néel temperature of the antiferromagnetic layer. While continuing to apply the magnetic field, the spin valve is cooled to a temperature lower than the Néel temperature of the antiferromagnetic layer. Once the magnetic field is removed from the spin valve, the magnetization direction of the pinned layer will remain fixed, as a result of the exchange with the antiferromagnetic layer, so long as the temperature of the spin valve remains lower than the Néel temperature of the antiferromagnetic layer.

The free layer of a spin valve sensor must be stabilized against the formation of edge domain walls because domain wall motion results in electrical noise, which makes data recovery impossible. A common way to achieve stabilization is with a permanent magnet abutted junction design. Permanent magnets have a high coercive field (i.e., are hard magnets). The field from the permanent magnets stabilizes the free layer and prevents edge domain formation, and provides proper bias.

However, there are several problems with permanent magnet abutted junctions. To properly stabilize the free layer, the permanent magnets must provide more flux than can be closed by the free layer. This undesirable extra flux stiffens the edges of the free layer so that the edges cannot rotate in response to flux from the media, and may also cause shield saturation which adversely affects the ability of the sensor to read high data densities. The extra flux from the permanent magnets may produce multiple domains in the free layer and may also produce dead regions which reduce the sensitivity of the sensor. For very small sensors, which are needed for high density recording, the permanent magnet bias severely reduces the sensitivity of the free layer.

Tabs of antiferromagnetic material or "exchange tabs" have also been used to stabilize the free layer of magnetic sensors. Exchange tabs are deposited upon the outer regions of the free layer and are exchange coupled thereto. Functions of the exchange tabs include pinning the magnetization of the outer regions of the free layer in the proper direction, preventing the formation of edge domains and defining the width of an active area of the free layer by preventing free layer rotation at the outer regions of the free layer.

Additional stabilization techniques are desirable, particular for ultra high density heads with small sensors. For 100 Gbit/in$^2$ and beyond magnetic recording storage, the track and linear densities are both very demanding. A typical design for a 100 Gbit/in$^2$ head should have a linear density of about 700 kilobits per inch (KBPI) and a track density of about 145 kilotracks per inch (KTPI). The written track cell for such a head is about 1,000 angstroms by 250 angstroms (i.e., an aspect ratio of about 4). High linear density requires a narrow shield-to-shield spacing. In order to meet the track density requirement, a small sensor size is needed (e.g., 0.1 by 0.1 micrometers). A larger sensor will produce side readings from adjacent tracks.

A novel design is needed to deal with such ultra-high density recording, while maintaining a stable free layer dynamic response and good cross-track characteristics.

BRIEF SUMMARY OF THE INVENTION

A spin valve head according to the present invention includes a spin valve stack having a free layer, a first spacer layer, a pinned layer and a pinning layer. The spin valve stack is configured to operate in a current perpendicular to plane (CPP) mode, wherein a sense current flows substantially perpendicular to a longitudinal plane of the first spacer layer. The spin valve head includes a first shield and a second shield coupled to opposing sides of the spin valve stack. The first and the second shields act as electrodes to couple the sense current to the spin valve stack. The first shield has a concave shape and substantially surrounds the free layer. The spin valve head also includes a second spacer layer and a layer of antiferromagnetic material. The second spacer layer is formed on the free layer. The layer of antiferromagnetic material is formed on the second spacer layer.

The spin valve head of the present invention senses ultra-high density recording, while maintaining a stable free layer dynamic response and good cross-track characteristics. The need for permanent magnet bias is eliminated, allowing a small sensor to be used to meet high track density requirements. The concave wrapped shield configuration reduces the side reading of the head.

DETAILED DESCRIPTION

Figure 1:
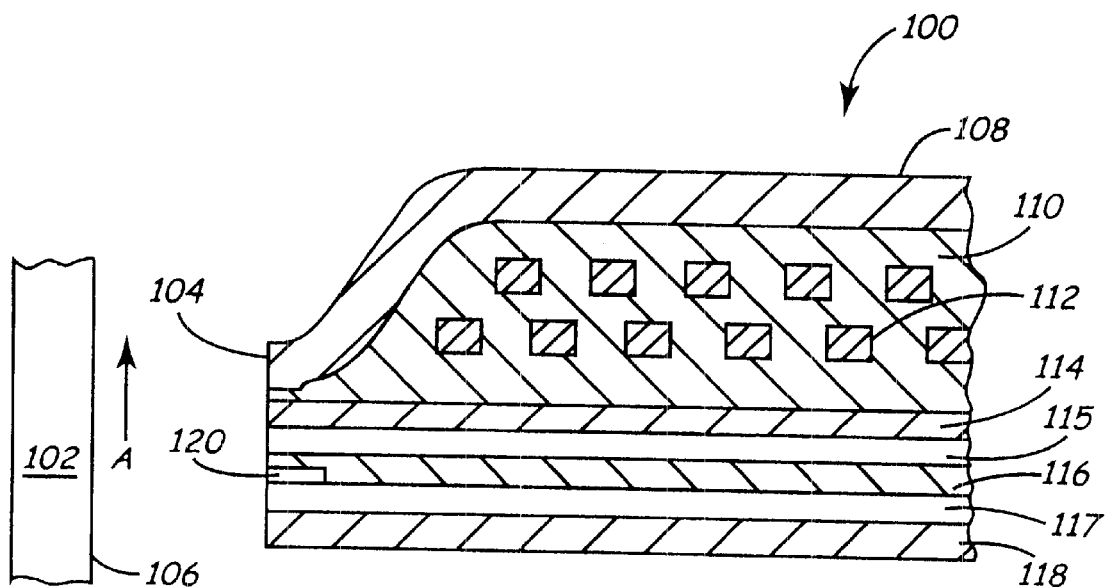
FIG. 1 is a cross-sectional view of a magnetic read/write head and magnetic disc taken along a plane normal to an air bearing surface of the read/write head.

FIG. 1 is a cross-sectional view of magnetic read/write head 100 and magnetic disc 102 taken along a plane normal to air bearing surface 104 of read/write head 100. Air bearing surface 104 of magnetic read/write head 100 faces disc surface 106 of magnetic disc 102. Magnetic disc 102 travels or rotates in a direction relative to magnetic read/write head 100 as indicated by arrow A. Spacing between air bearing surface 104 and disc surface 106 is preferably minimized while avoiding contact between magnetic read/write head 100 and magnetic disc 102.

A writer portion of magnetic read/write head 100 includes top pole 108, insulator layer 110, conductive coils 112 and top shield 114. Conductive coils 112 are held in place between top pole 108 and top shield 114 by use of insulator 110. Conductive coils 112 are shown in FIG. 1 as two layers of coils but may also be formed of more layers of coils as is well known in the field of magnetic read/write head design.

A reader portion of magnetic read/write head 100 includes top shield 114, top gap layer 115, metal contact layer 116, bottom gap layer 117, bottom shield 118, and giant magnetoresistive (GMR) stack 120. Metal contact layer 116 is positioned between top gap layer 115 and bottom gap layer 117. GMR stack 120 is positioned between terminating ends of metal contact layer 116 and bottom gap layer 117. Top gap layer 115 is positioned between top shield 114 and metal contact layer 116. Bottom gap layer 117 is positioned between metal contact layer 116 and bottom shield 118. Top shield 114 functions both as a shield and as a shared pole for use in conjunction with top pole 108.

Figure 2:
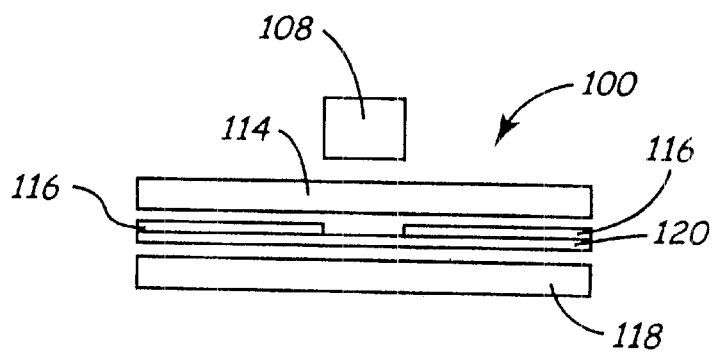
FIG. 2 is a layer diagram of an air bearing surface of a magnetic read/write head.

FIG. 2 is a layer diagram of air bearing surface 104 of magnetic read/write head 100. FIG. 2 illustrates the location of magnetically significant elements in magnetic read/write head 100 as they appear along air bearing surface 104 of magnetic read/write head 100 of FIG. 1. In FIG. 2, all spacing and insulating layers of magnetic read/write head 100 are omitted for clarity. Bottom shield 118 and top shield 114 are spaced to provide for a location of GMR stack 120. GMR stack 120 has two passive regions defined as the portions of GMR stack 120 adjacent to metal contact layer 116. An active region of GMR stack 120 is defined as the portion of GMR stack 120 located between the two passive regions of GMR stack 120. The active region of GMR stack 120 defines a read sensor width.

Figure 3:
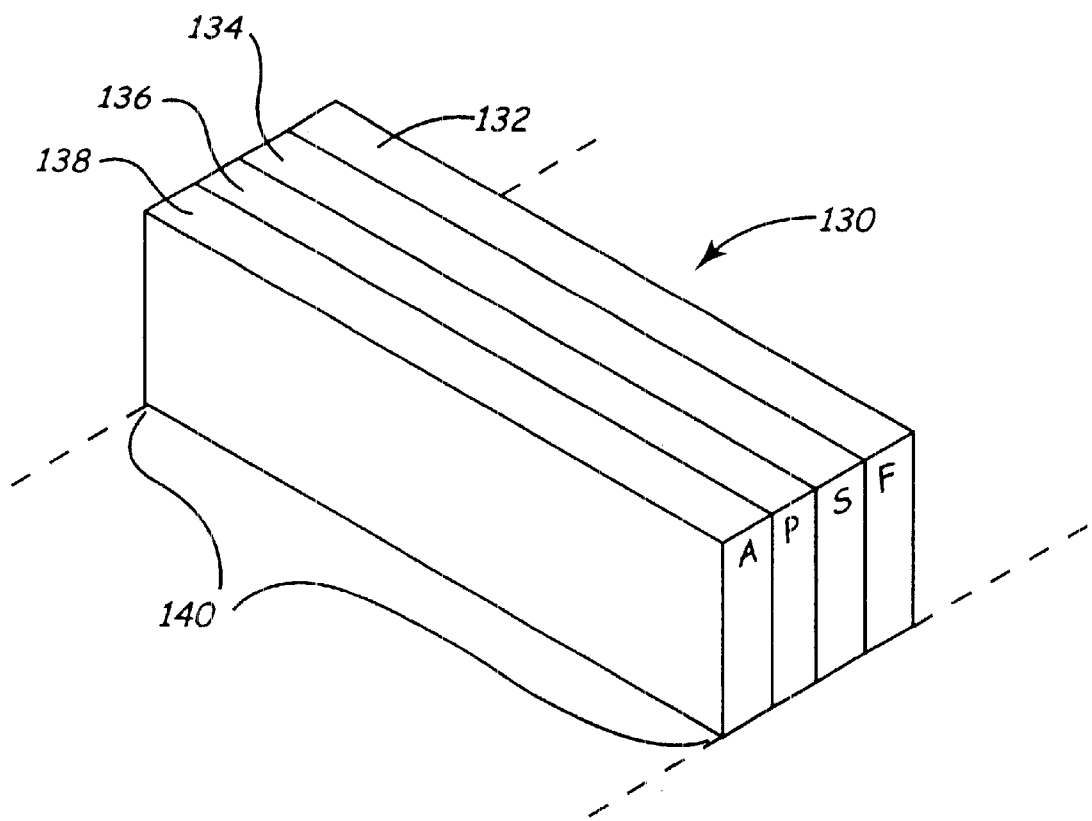
FIG. 3 is a perspective view of a prior art GMR stack.

FIG. 3 is a perspective view of a prior art GMR stack 130. GMR stack 130 has free layer 132, spacer layer 134, pinned layer 136, and antiferromagnetic layer 138. Spacer layer 134 is positioned between free layer 132 and pinned layer 136. A magnetization of pinned layer 136 is fixed in a predetermined direction, generally normal to air bearing surface 140 of GMR stack 130, while a magnetization of free layer 132 rotates freely in response to an external magnetic field (not shown in FIG. 3). Antiferromagnetic layer 138 is positioned on GMR stack 130 such that pinned layer 136 is between spacer layer 134 and antiferromagnetic layer 138. The magnetization of pinned layer 136 is pinned by exchange coupling pinned layer 136 with antiferromagnetic layer 138.

The resistance of GMR stack 130 varies as a function of an angle that is formed between the magnetization of pinned layer 136 and the magnetization of free layer 132. The magnetization of pinned layer 136 remains fixed in one direction, while the magnetization of free layer 132 rotates in response to a magnetic field emanating from a magnetic media or disc. The angle formed between the magnetization of free layer 132 and the magnetization of pinned layer 136 is, therefore, directly related to the magnetic field emanating from a magnetic media or disc. Consequently, the resistance of GMR stack 130 is directly related to the magnetic field emanating from the magnetic media or disc.

Figure 4:
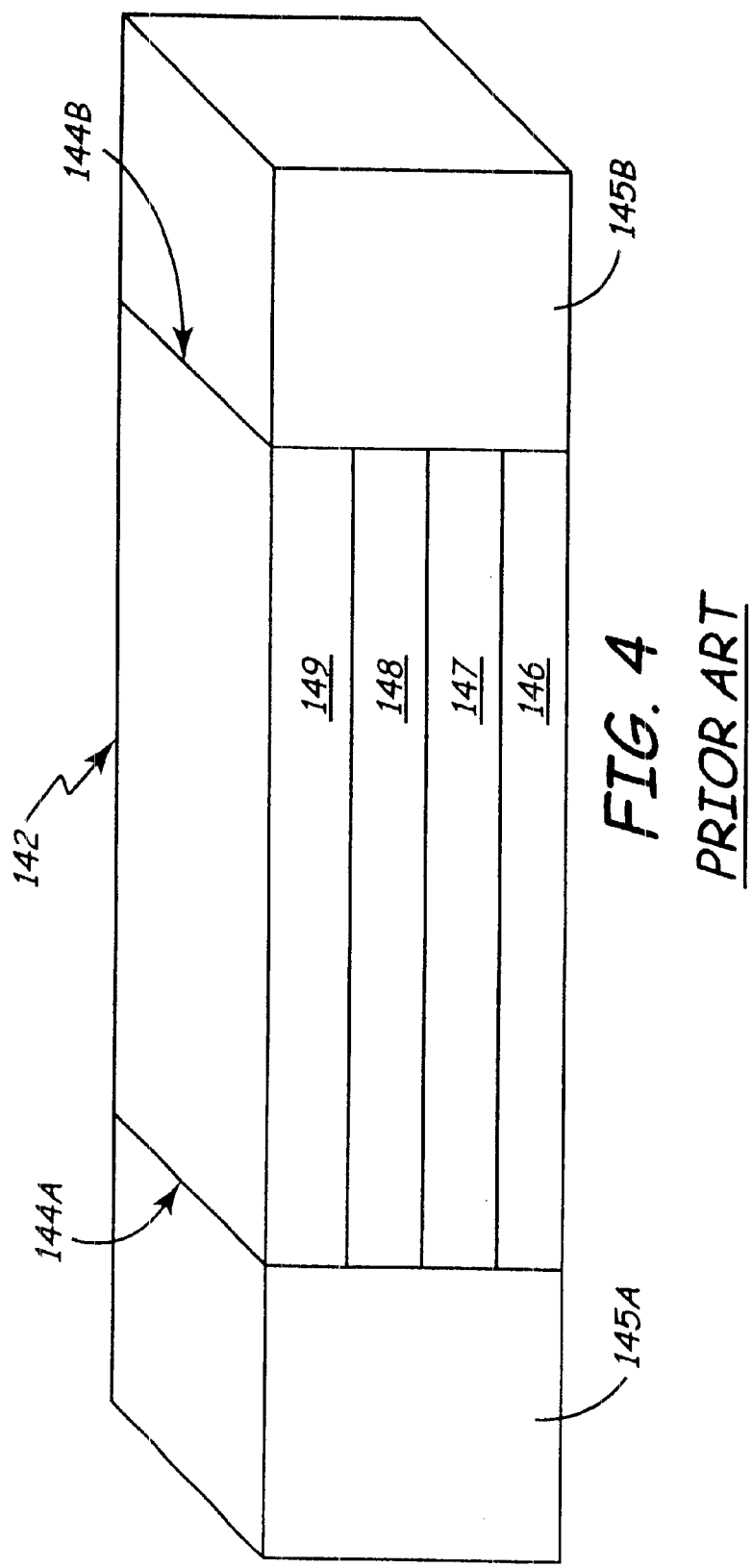
FIG. 4 is a perspective view of a prior art GMR spin valve stack with permanent magnet abutted junctions.

FIG. 4 is a perspective view of prior art GMR spin valve stack 142 with permanent magnet abutted junctions. GMR stack 142 includes permanent magnets 145A and 145B, pinning layer 146, pinned layer 147, spacer layer 148 and free layer 149. Pinned layer 147 is positioned over pinning layer 146. Spacer layer 148 is positioned over pinned layer 147. Free layer 149 is positioned over spacer layer 148. Permanent magnets 145A and 145B are placed on each side of GMR stack 142. Junction 144A is located between permanent magnet 145A and a first edge of layers 146–149. Junction 144B is positioned between permanent magnet 145B and a second edge of layers 146–149.

The field from permanent magnets 145A and 145B stabilizes free layer 149 and prevents edge domain formation, and provides proper bias. However, there are several problems with the permanent magnet abutted junction design shown in FIG. 4. To properly stabilize free layer 149, permanent magnets 145A and 145B must provide more flux than can be closed by free layer 149. This undesirable extra flux stiffens the edges of free layer 149 and may also cause shield saturation. The extra flux from permanent magnets 145 may produce multiple domains in free layer 149 and may also produce dead regions which reduce the sensitivity of the sensor. These undesirable effects are particularly problematic for very small sensors, which are needed for high density recordings.

Figure 5A:
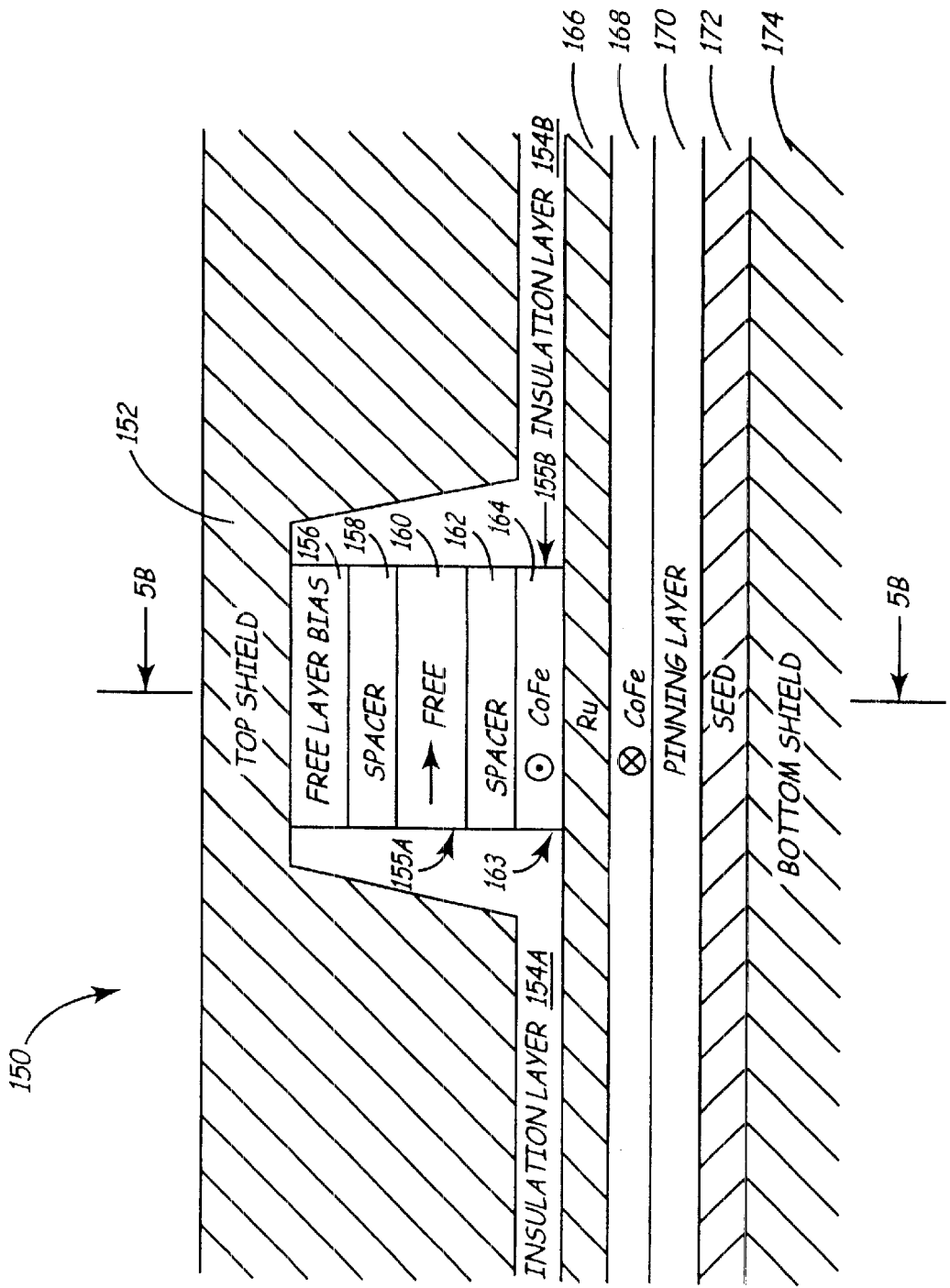
FIG. 5A shows an ABS view of a CPP type of spin valve according to the present invention.

FIG. 5A shows an ABS view of a CPP type of spin valve according to the present invention. Spin valve head 150 includes top shield 152, insulation layers 154A and 154B, bias layer 156, spacer layer 158, free layer 160, second spacer layer 162, pinned layer 163, pinning layer 170, seed layer 172 and bottom shield 174. Top shield 152 also acts as a shared pole in merged read/write heads. Bias layer 156 is preferably IrMn, PtMn, NiMn, RhMn, RuRhMn or similar antiferromagnetic material. Spacer layers 158 and 162 are preferably Cu, although other materials including Au, Ag, NiFeCr, Al and Ru can alternatively be used. Free layer 160 is a ferromagnetic layer such as NiFe. The magnetization of free layer 160 is shown by an arrow on that layer. Pinned layer 163 is a synthetic antiferromagnet or SAF, and includes first CoFe layer 164, Ru spacer layer 166 and second CoFe layer 168. When two ferromagnetic layers, such as CoFe layers 164 and 168 are separated by an Ru spacer of an appropriate thickness, the two ferromagnetic layers couple strongly with magnetic moments anti-parallel as shown by the circled "X" (into the paper) and circled dot (out of the paper) on these layers. The use of a synthetic antiferromagnet for pinned layer 163 provides a reduced demagnetization field, and provides better magnetic stability. Alternatively, pinned layer 163 could be a single soft magnetic layer, such as CoFe. Pinning layer 170 is preferably IrMn, PtMn, NiMn, RhMn, RuRhMn or similar antiferromagnetic material. Insulation layers 154A and 154B are preferably alumina or $SiO_2$.

Top shield 152 has a concave shape and is wrapped around free layer 160. Since there are no permanent magnet layers positioned adjacent to the edges of free layer 160, top shield 152 may be positioned close to the ends of free layer 160 and thereby reduce any side reading. A reduction in the side reading helps to improve the TPI resolution of spin valve head 150. Top shield 152 and bottom shield 174 act as electrodes for conducting a sense current. The sense current flows between top shield 152 and bottom shield 174 and through layers 156–172. This mode of operation, where the sense current flows perpendicular to the plane of spacer layer 162, is referred to as current perpendicular to plane or CPP mode. Operation in CPP mode provides an enhanced GMR response.

Layers 156–164 include end regions 155A and 155B. Since the area near end regions 155A and 155B is free of any metallic layers, like contact and permanent magnet layers, the ends of free layer 160 may be positioned close to top shield 152, which confines the bit flux lateral conduction and reduces the side reading when head 150 is off track.

Layers 156 and 158 serve to stabilize free layer 160, as well as to improve the GMR ratio due to the spin filter effect. The spin filter effect refers to the increase in GMR caused by positioning the free layer between two copper layers, and thereby creating two copper layer/free layer interfaces.

The antiferromagnetic materials used for layers 156 and 170 preferably have a high blocking temperature. However, since layer 156 is in contact with shield 152, which is highly conductive, the requirement of a high blocking temperature is relaxed.

Figure 5B:
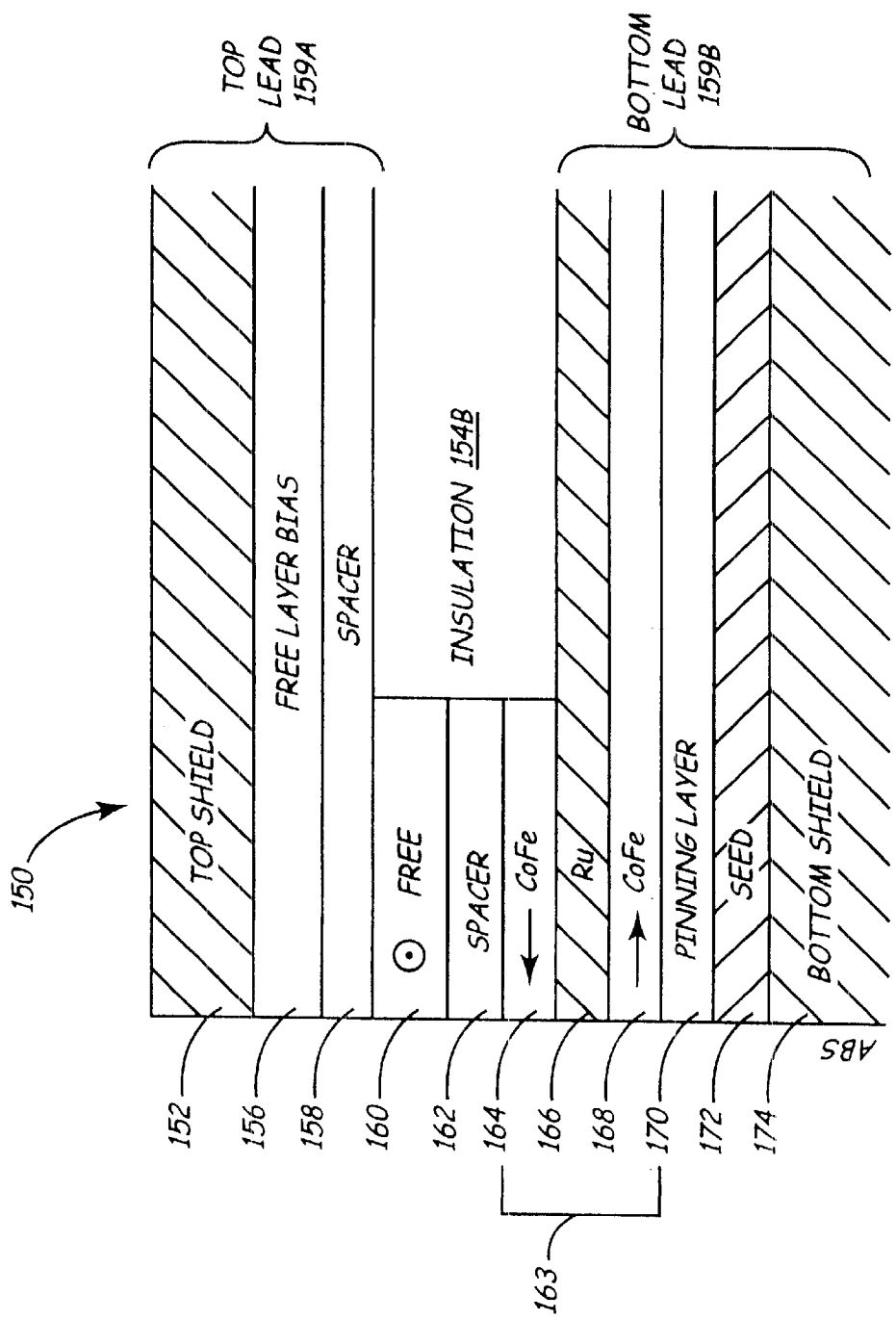
FIG. 5B shows a cross-sectional view of a CPP type of spin valve according to the present invention.

FIG. 5B shows a cross-sectional view of spin valve head 150. As shown in FIG. 5B, top lead 159A includes top shield 152, bias layer 156 and spacer layer 158. Bottom lead 159B includes Ru spacer layer 166, CoFe layer 168, pinning layer 170, seed layer 172 and bottom shield 174. The magnetizations of CoFe layers 164 and 168 are indicated by arrows, and the magnetization of free layer 160 is out of the paper as indicated by the circled dot on that layer.

Figure 6A:
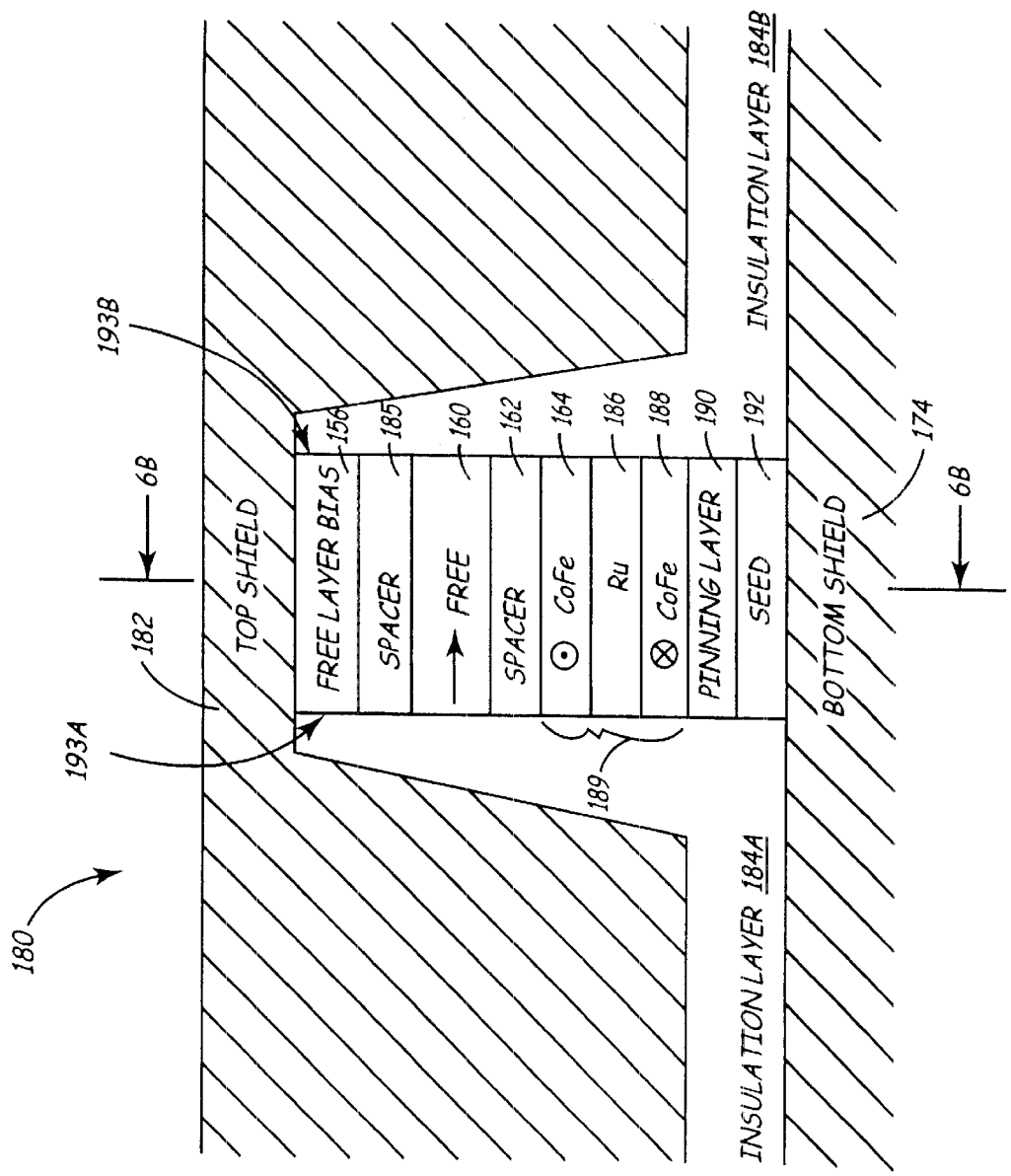
FIG. 6A shows an ABS view of a second embodiment of a CPP type of spin valve according to the present invention, which provides additional shielding of the free layer.

FIG. 6A shows an ABS view of a second embodiment of a CPP type of spin valve according to the present invention, which provides additional shielding of the free layer. CPP spin valve 180 includes top shield 182, bias layer 156, spacer layer 185, free layer 160, second spacer layer 162, pinned layer 189, pinning layer 190, seed layer 192, insulation layers 184A and 184B, and bottom shield 174. Pinned layer 189 is a synthetic antiferromagnet, and includes first CoFe layer 164, Ru spacer layer 186 and second CoFe layer 188. The sensor stack includes end regions 193A and 193B. By cutting the entire sensor stack such that all of the layers of the stack line up as shown in FIG. 6A (rather than cutting just the top 5 layers as shown in FIG. 5A), top shield 182 may be wrapped around additional layers of the stack and thereby provide further shielding of the sensor stack. Furthermore, since no GMR layer is beyond the physical track width, the side reading is reduced.

Figure 6B:
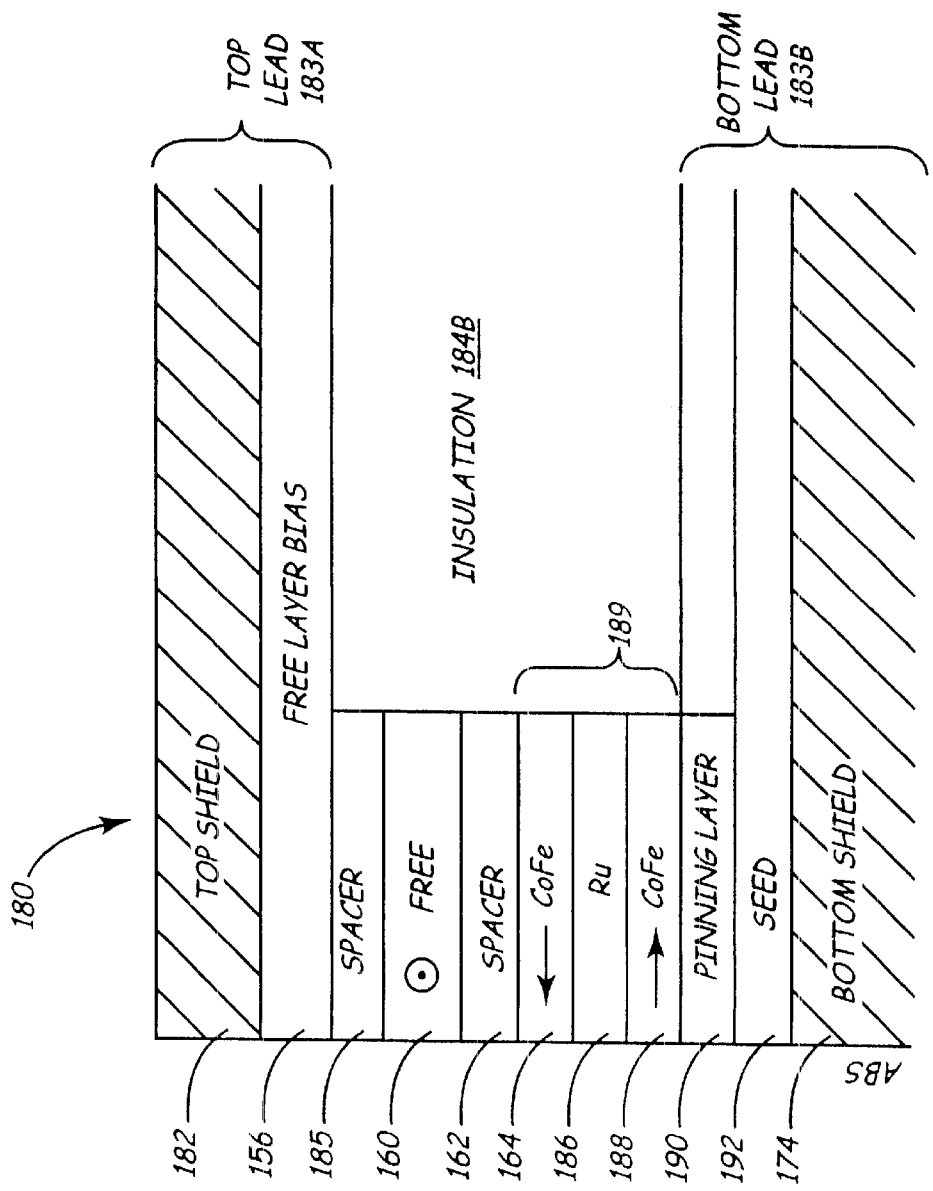
FIG. 6B shows a cross-sectional view of a second embodiment of a CPP type of spin valve according to the present invention, which provides additional shielding of the free layer.

FIG. 6B shows a cross-sectional view of spin valve head 180. Spin valve head 180 has a different lead configuration than the embodiment shown in FIG. 5B. Top lead 183A includes top shield 182 and bias layer 156. Bottom lead 183B includes pinning layer 190, seed layer 192 and bottom shield 174. The magnetizations of CoFe layers 164 and 188 are indicated by arrows, and the magnetization of free layer 160 is out of the paper as indicated by the circled dot on that layer.

Figure 7:
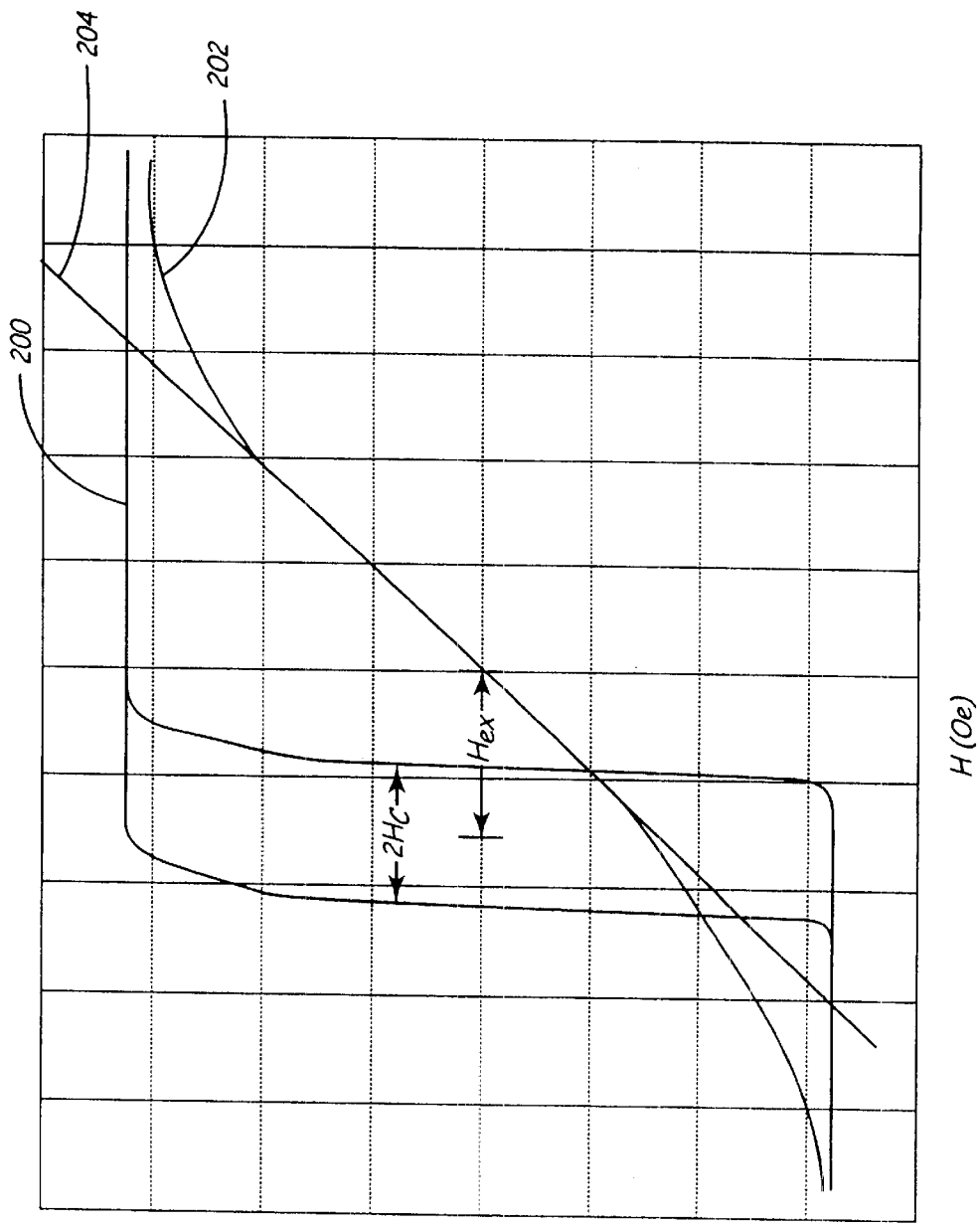
FIG. 7 shows typical M-H loops of an exchange biased NiFe free layer with a structure NiFe/Cu(10 Å)/IrMn.

The sensitivity of free layer 160 can be adjusted to a desirable value using layers 156 and 185. Free layer 160 should be pinned to a certain degree to ensure stability, but must also be allowed to rotate in response to flux from magnetic media. When an antiferromagnetic layer (like bias layer 156) is coupled to a ferromagnetic layer (like free layer 160), the ferromagnetic layer has an induced anisotropy along the unidirectional exchange coupling field direction, which is characterized by an open hysteresis loop with an offset from zero field. FIG. 7 shows an example of such a loop. One-half of the width of hysteresis loop 200 is referred to as the coercivity, or $H_c$. The amount that hysteresis loop 200 is offset from the zero field point is represented by $H_{ex}$, which is the exchange field or pinning field. Bias layer 156 preferably provides a pinning field in a direction parallel to the ABS, although the pinning field may alternatively be canted away from the ABS at an angle of, for example, 10 degrees.

FIG. 7 also shows hard axis loop 202, which is very closed with a purely rotational reversal process. The hard axis is perpendicular to the pinning field. The hard axis anisotropy field, $H_k$, is the field magnitude that is needed to drive the ferromagnetic layer (e.g., free layer 160) into saturation along the hard axis. In FIG. 7, the value of $H_k$ is given by the intersection of line 204 with easy axis loop 200. Line 204 is tangent to hard axis loop 202. $H_k$ is approximately equal to $H_{ex}+H_c$ along the easy axis (i.e., along the pinning field). The sum of $H_{ex}$ and Hc is referred to as the effective Hk. The permeability of an exchange biased soft magnetic layer is inversely proportional to the effective $H_k$.

By introducing a highly conductive metallic layer like Cu between layers 156 and 160, the exchange field ($H_{ex}$), the effective $H_k$ and the permeability can be finely tuned to a desirable value. The following three tables show the exchange field, coercivity and $H_k$ for IrMn, PtMn, and NiMn antiferromagnets coupled to a NiFe layer with a varying thickness Cu spacer layer. Data are shown for two cases—as made, and after annealing.

TABLE 1

(IrMn/Cu/NiFe)

| | As-made | | | Annealed | | |
|---|---|---|---|---|---|---|
| Cu layer (Å) | $H_{ex}$ | $H_c$ | $H_k$ | $H_{ex}$ | $H_c$ | $H_k$ |
| 0 | 38.6 | 2.2 | 40 | 24 | 3.1 | 27 |
| 5 | 16.2 | 2.3 | 15 | 9.1 | 2.9 | 13 |
| 10 | 3.9 | 1.6 | 5.5 | 2.8 | 2.2 | 5.9 |
| 15 | 0.9 | 1.2 | 3.0 | 0.8 | 1.8 | 2.9 |

TABLE 2

(PtMn/Cu/NiFe)

| | As-made | | | Annealed | | |
|---|---|---|---|---|---|---|
| Cu layer (Å) | $H_{ex}$ | $H_c$ | $H_k$ | $H_{ex}$ | $H_c$ | $H_k$ |
| 0 | | | | 168 | 155 | 300 |
| 5 | | | | 142 | 110 | 260 |
| 10 | | | | 93 | 60 | 150 |
| 15 | | | | 50 | 35 | 80 |

TABLE 3

(NiMn/Cu/NiFe)

| | As-made | | | Annealed | | |
|---|---|---|---|---|---|---|
| Cu layer (Å) | $H_{ex}$ | $H_c$ | $H_k$ | $H_{ex}$ | $H_c$ | $H_k$ |
| 0 | 15.8 | 4.9 | 20 | 241 | 150 | 395 |
| 5 | 12.8 | 3.5 | 16 | 212 | 135 | 350 |
| 10 | 1.99 | 1.7 | 3.7 | 149 | 110 | 260 |
| 15 | 0.79 | 1.7 | 2.6 | 90 | 70 | 160 |

No data is shown above for the "As-made" case for PtMn because annealing is required to induce pinning for this material. It is clear from the above tables that the effective $H_k$ can be adjusted. It is also evident from the above tables that annealing can be used to modify and further optimize the sensitivity of free layer 160. In the finished head, the sensitivity of free layer 160 is dominated by the shape anisotropy of free layer 160, which is proportional to mst/h. The letters "ms" in "mst/h" represent the saturation magnetization of free layer 160, "t" represents the thickness of free layer 160, and "h" represents the stripe height. The exchange coupling induced anisotropy is a small term in the effective anisotropy.

Figure 8:
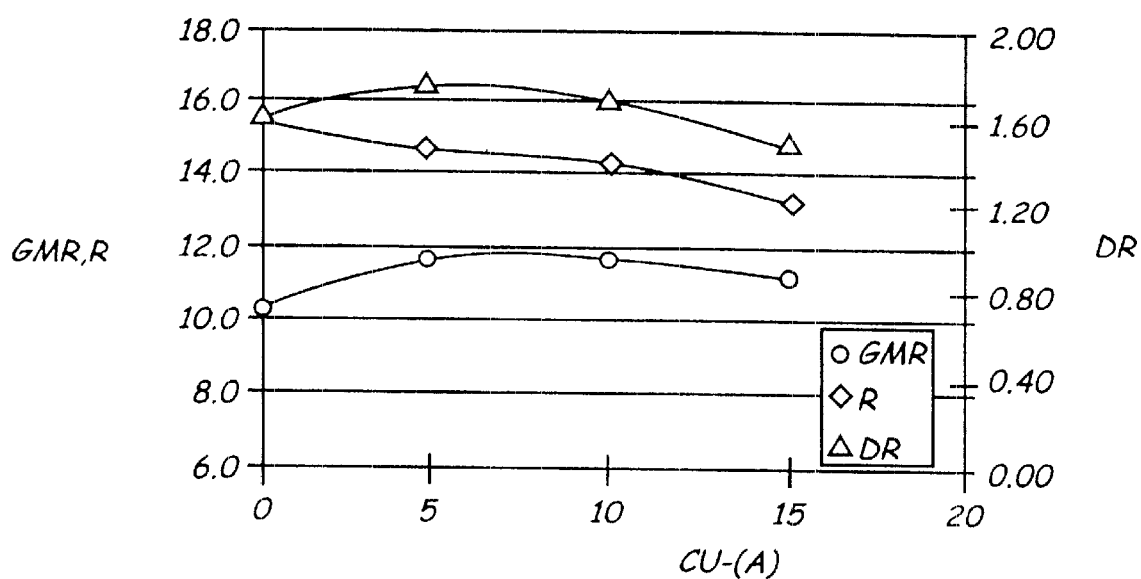
FIG. 8 shows a graph of GMR, R and dR versus thickness of a Cu spacer layer in a spin valve with IrMn free layer stabilization.
Figure 9:
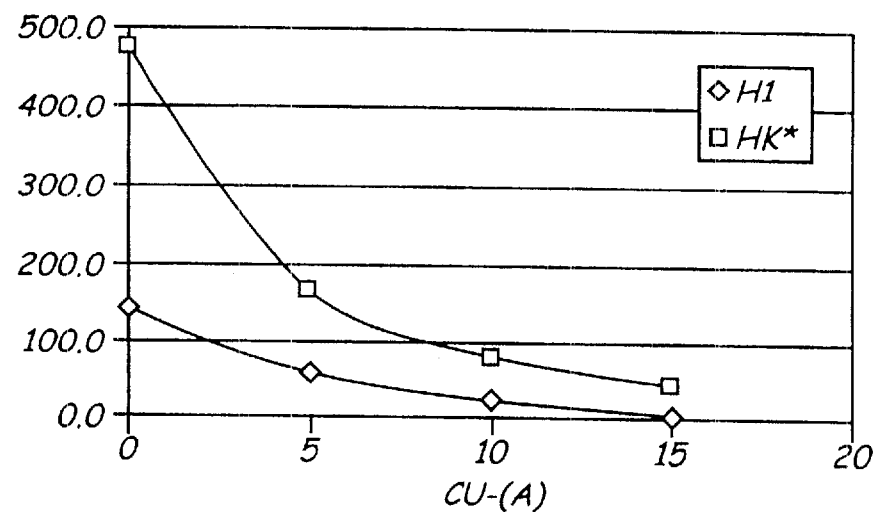
FIG. 9 shows a graph of interlayer coupling (H1) and effective $H_k$ for a spin valve with IrMn free layer stabilization.
Figure 10:
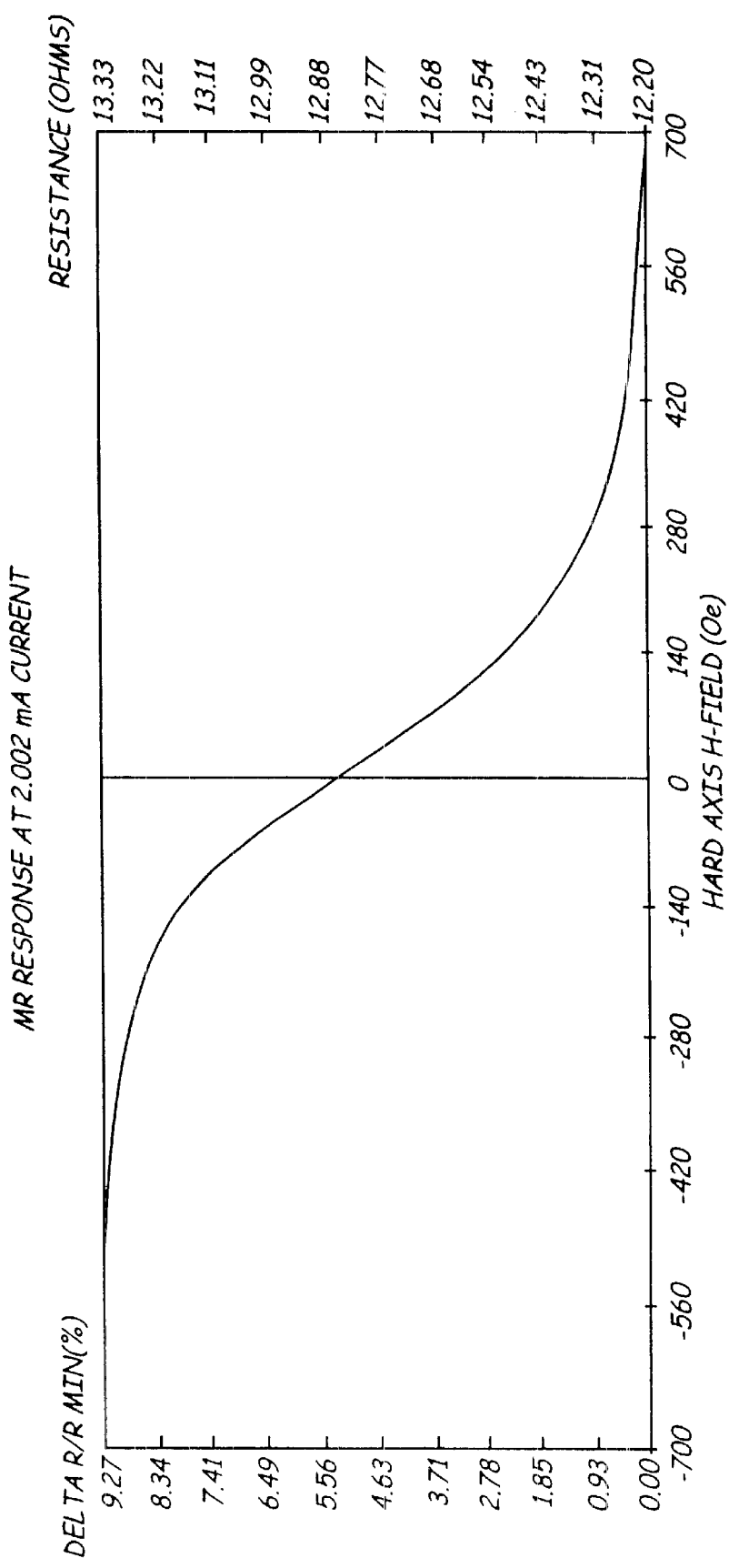
FIG. 10 shows a graph of R and dR versus hard axis field for a spin valve with IrMn free layer stabilization.

FIGS. 8–10 show test data for an IrMn stabilization layer 156 exchange coupled to free layer 160. Two annealing steps are used to set the magnetizations of spin valve 150. A first anneal is used to induce magnetization of pinned layer 163 perpendicular to the ABS. A second anneal, referred to as a cross anneal, is used to induce magnetization of free layer 160 parallel to the ABS. The cross anneal is preferably done at 250 C. for two hours, although other times and temperatures may be used. The stabilization field is, therefore, perpendicular to the pinning field.

FIG. 8 shows a graph of GMR, R and dR versus thickness of spacer layer 158 in spin valve 150 with IrMn free layer stabilization. As shown in FIG. 8, GMR is almost constant, and both dR and R decrease with increasing thickness of spacer layer 158.

FIG. 9 shows a graph of interlayer coupling (H1) and effective Hk (actually 2 $H_K^*$ or two times the effective $H_k$) for a spin valve 150 with IrMn free layer stabilization. H1 and effective $H_k$ both decrease with increasing thickness of spacer layer 158. 2 $H_K^*$ is approximately 480 Oe when IrMn stabilization layer 156 is in direct contact with free layer 160. 2 $H_K^*$ decreases (and the slope of the R-H curve increases) dramatically with increasing thickness of spacer layer 158. Interlayer coupling (H1) between free layer 160 and stabilization layer 156 was measured along the hard axis. The hard axis is parallel to the ABS and the easy axis is perpendicular to the ABS. H1 measures the field shift of the hard axis loop when the resistance reaches a minimum. The resistance is a minimum when the magnetizations of free layer 160 and pinned layer 163 are aligned. A magnetic field is applied along the hard axis in the opposite direction of the stabilization field. When the applied magnetic field is equal to the stabilization field, there is zero net magnetic field along the ABS direction, the magnetization of free layer 160 aligns with that of pinned layer 163, and the resistance reaches a minimum.

Effective $H_k$ in FIG. 9 was obtained by applying a field along the easy axis. Effective $H_k$ is given by the field width of the sloped region of the R-H curve (see FIG. 10). Because of the stabilization field along the hard axis, it is more difficult to rotate free layer 160 along the easy axis. This effect is referred to as the effective $H_k$.

FIG. 10 shows a graph of R and dR versus hard axis field for a spin valve 150 with IrMn stabilization of free layer 160. Free layer 160 follows a rotational path with no hysteresis. For all values of Cu spacer 158 thickness, the Hc of free layer 160 measured along the hard axis direction is very narrow (less than 1 Oe under an applied field of 100 Oe).

Although the present invention has been described with reference to preferred embodiments, workers skilled in the art will recognize that changes may be made in form and detail without departing from the spirit and scope of the invention. For example, the spin valve sensor can be either a top or a bottom spin valve stack. The shield that wraps around the spin valve stack can either be the top shield or the bottom shield, and a different contact lead layout can be used to reduce the lead resistance. Other modifications are also possible.

What is claimed is:

1. A spin valve head comprising:
    a spin valve stack including a free layer, a first spacer layer, a pinned layer and a pinning layer, the spin valve stack configured to operate in a current perpendicular to plane (CPP) mode wherein a sense current flows substantially perpendicular to a longitudinal plane of the first spacer layer;
    a first shield and a second shield coupled to opposing sides of the spin valve stack, wherein the first shield has a concave shape and substantially surrounds the free layer; and
    stabilization means for stabilizing the free layer and controlling the sensitivity thereof.

2. The spin valve head of claim 1, wherein the stabilization means comprises a second spacer layer and a layer of antiferromagnetic material, the second spacer layer formed on the free layer, the layer of antiferromagnetic material formed on the second spacer layer.

3. The spin valve head of claim 2, wherein the layer of antiferromagnetic material is one of IrMn, PtMn, NiMn, RhMn, and RuRhMn.

4. The spin valve head of claim 2, wherein the first and the second spacer layers are Cu.

5. The spin valve head of claim 1, wherein the pinned layer is a synthetic antiferromagnet.

6. The spin valve head of claim 5, wherein the synthetic antiferromagnet includes a first and a second layer of CoFe separated by a layer of Ru.

7. The spin valve head of claim 1, wherein the first shield substantially surrounds the stabilization means, the free layer, the first spacer layer and the pinned layer.

8. The spin valve head of claim 7, wherein the first and second shields each include a first and a second outer region separated by a central region at an air bearing surface of the spin valve head, the first and the second shields separated by only an insulation layer at the outer regions and separated by the spin valve stack at the central region.

9. The spin valve head of claim 1, wherein the stabilization means is formed over the free layer, and wherein the stabilization means provides a pinning field canted away from an air bearing surface of the head.

10. A spin valve head configured to operate in a current perpendicular to plane (CPP) mode, the spin valve head having an air bearing surface (ABS), the spin valve head comprising:
 a top shield and a bottom shield, each shield having a first and a second outer region separated by a central region at the ABS;
 an insulation layer positioned between the top and the bottom shields at the first and the second outer regions; and
 a spin valve stack coupled between the top and the bottom shields in the central region, wherein the top shield substantially surrounds the spin valve stack.

11. The spin valve head of claim 10, wherein the top and the bottom shields act as electrodes to couple a sense current to the spin valve stack.

12. The spin valve head of claim 10, wherein the spin valve stack includes a free layer, a first spacer layer, a pinned layer and a pinning layer.

13. The spin valve head of claim 12, wherein the spin valve stack further includes a second spacer layer and a layer of antiferromagnetic material, the second spacer layer formed on the free layer and the layer of antiferromagnetic material formed on the second spacer layer.

14. The spin valve head of claim 13, wherein the layer of antiferromagnetic material is one of IrMn, PtMn, NiMn, RhMn, and RuRhMn.

15. The spin valve head of claim 13, wherein the first and the second spacer layers are Cu.

16. The spin valve head of claim 13, wherein the pinned layer is a synthetic antiferromagnet.

17. The spin valve head of claim 16, wherein the synthetic antiferromagnet includes a first and a second layer of CoFe separated by a layer of Ru.

18. The spin valve head of claim 13, wherein the pinning layer is formed on a seed layer.

* * * * *